United States Patent [19]

Carpenter et al.

[11] Patent Number: 4,547,220
[45] Date of Patent: Oct. 15, 1985

[54] REDUCTION OF MoO₃ AND AMMONIUM MOLYBDATES BY AMMONIA IN A ROTARY FURNACE

[75] Inventors: Kent H. Carpenter, Ann Arbor; Gerald E. Whorley, deceased, late of Bronson, by Diana Whorley, executrix; Thomas W. Lennard, Coldwater, all of Mich.

[73] Assignee: Amax Inc., Greenwich, Conn.

[21] Appl. No.: 603,392

[22] Filed: Apr. 24, 1984

[51] Int. Cl.⁴ ............................................. C22B 34/34
[52] U.S. Cl. ........................................ 75/84; 266/173; 266/163
[58] Field of Search ............................................. 75/84

[56] References Cited

U.S. PATENT DOCUMENTS

| | | | |
|---|---|---|---|
| 3,146,093 | 8/1964 | Foos et al. | 75/84 |
| 3,833,352 | 9/1974 | Voljkovic | 75/84 |
| 3,865,573 | 2/1975 | Neumann et al. | 75/84 |
| 4,045,216 | 8/1977 | Meyer et al. | 75/84 |

FOREIGN PATENT DOCUMENTS 609487 10/1948 United Kingdom ..................... 75/84

Primary Examiner—Allan M. Lieberman
Attorney, Agent, or Firm—Michael A. Ciomek; Eugene J. Kalil

[57] ABSTRACT

A method is disclosed for the intermediate reduction of a molybdenum compound selected from the group consisting of $MoO_3$ and ammonium molybdate to $MoO_2$. The molybdenum compound is fed to an indirectly fired inclined rotary calciner and uncracked ammonia caused to flow to the rotary calciner either concurrently or countercurrently to the flow of the molybdenum compound. The residence time and temperature are controlled to produce $MoO_2$ at a conversion efficiency of at least about 80%.

11 Claims, 2 Drawing Figures

REDUCTION OF MoO₃ AND AMMONIUM MOLYBDATES BY AMMONIA IN A ROTARY FURNACE

This invention relates to the reduction of molybdenum compounds to $MoO_2$ using uncracked ammonia and, in particular, to the reduction of molybdenum compounds selected from the group consisting of $MoO_3$ and ammonium molybdates.

STATE OF THE ART

It is known to produce molybdenum metal powder by the hydrogen reduction of molybdenum compounds. A problem with using hydrogen for reducing $MoO_3$ and ammonium molybdates to $MoO_2$ and subsequently $MoO_2$ to molybdenum metal powder is that the reactions are difficult to control. For example, when using hydrogen as the reductant, the material being reduced, such as ammonium dimolybdate, undergoes an exothermal reaction and tends to reach temperatures far in excess of the furnace temperature which may cause the resulting oxides to fuse into clinkers and to volatilize by sublimation.

According to the book "The Metal Molybdenum" (pages 36–39), published by the American Society for Metals (1958), the most important compound of molybdenum is considered to be the trioxide. The reduction of trioxide by most reducing agents produces molybdenum dioxide. Subsequently, the dioxide is reduced to metal. However, under specially controlled conditions, it is possible to carry the reduction directly to molybdenum metal using hydrogen as the reductant.

It is well known to use pure ammonium molybdate crystals as the raw material for the production of molybdenum metal powder. When ammonium dimolybdate is reduced, various ammonium molybdates encountered in the literature can be found during various stages of the reduction.

The basic commercial process for producing pure molybdenum metal powder is the hydrogen reduction of ammonium molybdate or molybdenum trioxide. Because ammonium dimolybdate is easier to produce, it is generally preferred as the source of molybdenum trioxide. A two-stage reduction is normally employed in which the reduction to $MoO_2$ is carried out in the first stage, and the complete reduction to metal powder carried out in a second stage.

As illustrative of one method proposed for reducing ammonium molybdate, reference is made to U.S. Pat. No. 2,385,843. According to the disclosure of this patent, ammonium molybdate is reduced to molybdenum metal using hydrogen as the reducing agent but in which method some of the ammonia released from the molybdenum compound is used to assist in the reduction operation, steam being employed to control and prevent a runaway reaction.

In U.S. Pat. No. 3,264,098, the method there disclosed is directed to the batch-wise fluidized-bed reduction of a molybdenum compound selected from the group consisting of molybdenum oxide and ammonium paramolybdate to form free-flowing molybdenum metal powder in a one step operation. The molybdenum compound in finely divided form is fluidized in a vertical column with a reducing gas flowing therethrough at a predetermined temperature sufficient to reduce the starting compound to $MoO_2$, following which additional reducing gas is forced therethrough at a second predetermined temperature sufficient to reduce $MoO_2$ to molybdenum metal powder. As stated earlier, since hydrogen is the preferred reducing agent, care must be exercised to avoid a runaway reaction.

We have discovered a method for reducing a molybdenum compound, such as $MoO_3$ or ammonium dimolybdate in a rotating calciner, using uncracked ammonia, wherein the compound is controllably reduced to $MoO_2$ at high conversion efficiencies, which compound can later be reduced to molybdenum metal using conventional methods of reduction, such as hydrogen reduction.

OBJECTS OF THE INVENTION

It is an object of the invention to provide a method for reducing a molybdenum compound selected from the group consisting of molybdenum trioxide and ammonium molybdate and form molybdenum dioxide.

Another object is to provide a method of reducing a molybdenum compound selected from the group consisting of molybdenum trioxide and ammonium molybdate in a rotary calciner using uncracked ammonia to produce molybdenum dioxide having free-flowing properties.

These and other objects will more clearly appear when taken in conjunction with the following disclosure and the accompanying drawings, wherein.

THE INVENTION

Figure 1:
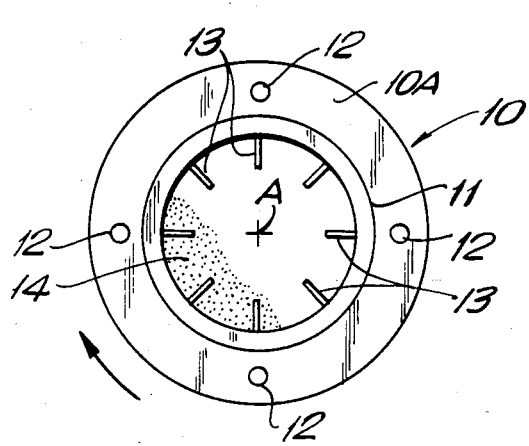
FIG. 1 is a schematic end view of a rotary calciner.

The invention is directed to a method for reducing $MoO_3$ or ammonium molybdate to an intermediate reduction product $MoO_2$. The method uses an indirect-fired horizontal rotary calciner in which the material to be reduced is fed into one end which is slightly elevated and transported to the opposite end by the slow rotation of the cylindrical calciner. Uncracked ammonia is used as the reducing gas which is fed either concurrent or countercurrent to the feed flow. The temperature may range from about 300° C. to 700° C., the temperature preferably being about 400° C. to 500° C., and more preferably about 450° C.

By controlling the residence time and the flow of the reactants a high conversion to $MoO_2$ can be obtained of at least about 80%, the conversion ranging typically 95% and higher.

An advantage of using ammonia over hydrogen is that the reduction takes place at a rate comparable to hydrogen but over a lower temperature range. In addition, unlike hydrogen, the use of ammonia enables a more controlled reaction as opposed to the tendency for a runaway reaction when substantial flow rates of hydrogen are employed.

A further advantage of using ammonia as a reducing agent is that the reduction of molybdenum trioxide per se or molybdenum trioxide formed during the reduction of ammonium molybdate crystals, e.g., ammonium dimolybdate, results in a morphological change in particle shape from the normally needle and platelet structure of $MoO_3$ to a dodecahedral structure of $MoO_2$. This confers freeflowing properties to the intermediate $MoO_2$ product which retains that property following reduction to molybdenum metal powder which is very useful in powder metallurgy application.

Stating it broadly, the invention provides a method for the intermediate reduction of a molybdenum compound selected from the group consisting of $MoO_3$ and ammonium molybdate to $MoO_2$, the method residing in feeding the molybdenum compound to one end of an indirect fired longitudinally shaped rotary calciner with said one end slightly elevated relative to its discharge end such that the compound flows during reduction to said discharge end. The rotary calciner is characterized by lifter means therein disposed about its inner periphery and extending along the length of the calciner and projecting radially inward towards the axis of rotation of the calciner to thereby effect continuous mixing of the compound during the ammonia reduction thereof. The method further includes causing uncracked ammonia to flow as a reductant either concurrently or countercurrently at a predetermined rate relative to the flow of the molybdenum compound at an amount calculated to range from about 5% to 100% excess of the stoichiometric amount required to reduce the compound to $MoO_2$, while controlling the residence time and temperature of the feed compound in the calciner relative to the flow rate of ammonia at a temperature ranging from about 300° C. to 700° C. such that the product discharged with respect to the formation of $MoO_2$ corresponds to a conversion efficiency of at least about 80%.

DETAILS OF THE INVENTION

Tests conducted in a 6-inch diameter rotary calciner with $MoO_3$ and ammonium dimolybdate indicated a high conversion efficiency of 97%. The feed material in these tests was fed at a rate of 45 grams per minute with a residence time in ammonia of approximately 30 minutes. The ammonia was fed countercurrent to the flow of the solids at a temperature of about 450° C.

In subsequent larger scale tests, the same materials were reduced in a 12-inch diameter calciner with a heated length of 7 feet, the material being fed at a rate of 417 grams per minute and at a retention time in ammonia of about 30 minutes. At a reducing temperature of about 450° C., essentially 100% conversion to $MoO_2$ was achieved.

Additional work on a large scale resulted in conversion efficiencies of about 89% at temperatures ranging from about 400° C. to 500° C. There was little tendency for the reaction to "runaway" in uncontrollable fashion. When the ammonia flow/temperature parameters were pushed to excess, there was only a gradual increase in the level of agglomerated particles with no observed fouling of the internal calciner surface.

The use of lifters in the calciner is very important for obtaining gas/solid contact efficiency. Referring to FIG. 1, the end view of a calciner 10 is shown schematically of cylindrical shape having an insulated furnace wall 10A, the calciner having supported within it a tube 11 of heat resistant material, such as the material known by the trademark Inconel (about 15% Cr, 7% Fe and balance nickel) having a wall thickness of about ⅜ inch. Running longitudinally through the insulated wall are electric heating elements 12. Lifters or vanes 13 are located around the periphery of tube 11, extending the length of the calciner and projecting radially inward towards the axis of rotation "A" as shown. As the calciner rotates, the feed material 14 cascades as shown and effects intimate mixing of the material, while continually exposing it to the ammonia reducing gas.

The lifters may have a simple vane construction as shown in FIG. 1 or comprise a helix extending longitudinally along and around the axis of rotation of the calciner. Thus, the expression "lifter means" used herein is meant to cover any form of lifter means, such as vanes, helices, etc., which will effect on rotation of the calciner uniform mixing of the powdered molybdenum compound being reduced while the compound is continually exposed to the ammonia reducing gas. The rotational speed of the calciner may be moderate and will generally range from about 3 to 10 rpm.

In carrying out the calcining in the presence of ammonia, the reactants should be brought up to temperatures at which they will react at a significant rate. The rate must be such as to allow sufficient residence time in the calciner to complete the conversion of the molybdenum compound to $MoO_2$.

Figure 2:
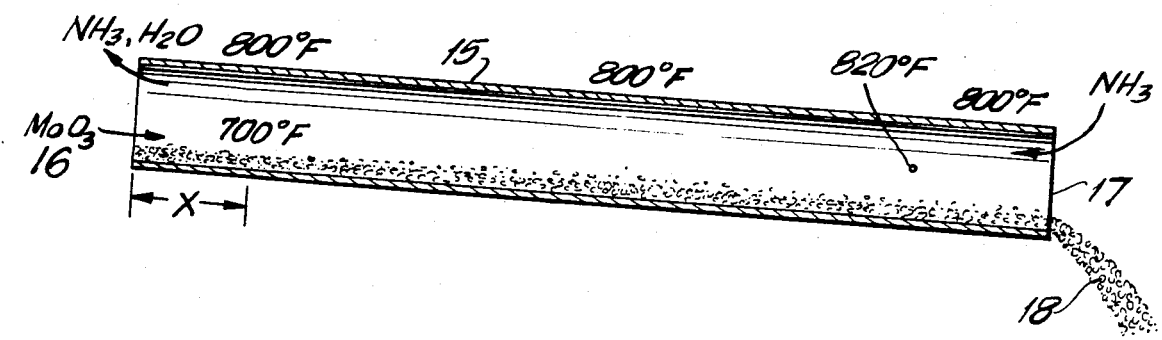
FIG. 2 is a schematic in elevation of a rotary calciner shown in simple cross section.

A schematic representation of the conversion of $MoO_3$ to $MoO_2$ is shown in FIG. 2. The calciner 15 is depicted slightly inclined to enable the flow of $MoO_3$ 16 from the feed end as shown to the discharge end 17 (lifters are not shown for purposes of clarity) from which the converted compound 18 is discharged comprising substantially all $MoO_2$, e.g. at least 80% conversion to $MoO_2$. The calciner is heated to about 800° F. At a distance "X" the feed is at about 700° F. and reaches about 840° F. during reaction near the discharge end.

As stated herein, the residence time and the rate of flow of reactants should be such as to assure a conversion efficiency of at least about 80% and, preferably, at least about 95%.

Generally speaking, the residence time in the calciner may range from about 10 to 60 minutes, e.g. 20 to 40 minutes. A typical calciner is one having a diameter of about 16 inches and a length in feet of about 20. At a feed rate of about 200 lbs/hr, a flow rate of ammonia of about 400 cubic feet per minute and a temperature of about 450° C., a conversion rate of at least 95% is attainable at a residence time of about 30 minutes.

As illustrative of a further embodiment of the invention, the following Example is given.

EXAMPLE

Molybdenum trioxide was reduced to $MoO_2$ in an indirect fired rotary calciner having 3 independently controlled zones of heating using gas firing. Each heating zone was approximately 5 feet in length for a total heated length of 15 feet. In addition, a 2 foot long feed section and a 6 foot long cooling and discharge section were used, resulting in an overall calciner tube length of approximately 23 feet. An internal set of radial 2-angle lifters was used, which ran through the entire heated zone and also through the cooling zone. The tube diameter was 16 inches, rotational speed 7 rpm and inclination 0.8°. The tube was preheated under a $N_2$ purge to a temperature of 450° C. (842° F.), and then purged with uncracked ammonia, $NH_3$. The ammonia flow rate was set at 120% of the stoichiometric amount required, or 178 ft³/hr at an $MoO_3$ feed rate of 90 lb/hr. Ammonia flow was countercurrent. After a 15 min $NH_3$ purge, the $MoO_3$ feed was started at 90 lb/hr. External "knockers" were used on the tube to insure that the powder did not adhere to the inner tube wall which would inhibit heat transfer. Material began to appear at the discharge end after approximately 40 minutes. Actual residence time in the heated zone was 30 minutes. After 2 hours, a sample was taken and analyzed for completeness of reaction, and was found to be 98.7% reacted to $MoO_2$. The duration of the test run was 15 hours, during which 1350 lb of $MoO_3$ were reduced to $MoO_2$. Subsequent hydrogen reduction to molybdenum metal powder yielded a free-flowing powder of average particle size of 2.7 microns.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for the intermediate reduction of a molybdenum compound selected from the group consisting of $MoO_3$ and ammonium molybdate to $MoO_2$ which comprises:

feeding said molybdenum compound to the feed end of an indirect fired longitudinally shaped rotary calciner with said feed end slightly elevated relative to its discharge end such that the said compound flows during reduction to said discharge end, said rotary calciner having lifters therein spaced about its inner periphery and extending along the length of the calciner and projecting radially towards the axis of rotation of said calciner to effect continuous mixing of said compound during the reduction thereof, causing uncracked ammonia to flow as a reductant either concurrently or countercurrently at a predetermined rate relative to the flow of said compound at an amount calculated to range from about 5% to 100% excess of the stoichiometric amount required to reduce the compound to $MoO_2$ while said calciner is rotating, and bringing said molybdenum compound and said ammonia to a temperature in the range of about 300° C. to 700° C. at which a significant rate of reaction obtains, said reaction rate at said temperature range together with the rotation rate of said calciner being such as to provide a sufficient residence time in said calciner to convert the molybdenum compound to $MoO_2$ at a conversion efficiency of at least about 80%.

2. The method of claim 1, wherein the molybdenum compound reduced is $MoO_3$.

3. The method of claim 1, wherein the molybdenum compound reduced is ammonium molybdate.

4. The method of claim 3, wherein the ammonium molybdate compound is ammonium dimolybdate.

5. The method of claim 1, wherein the speed of rotation of said calciner ranges from about 3 to 10 rpm.

6. The method of claim 1, wherein the calcining temperature ranges from about 400° C. to 500° C., and wherein the residence time during reduction ranges from about 10 to 60 minutes.

7. A free flowing product consisting essentially of $MoO_2$ produced in accordance with the method of claim 1.

8. A method for the intermediate reduction of ammonium dimolybdate to $MoO_2$ which comprises:

feeding said ammonium dimolybdate to the feed end of an indirect fired longitudinally shaped rotary calciner with said feed end slightly elevated relative to its discharge end such that the said compound flows during reduction to said discharge end, said rotary calciner having lifters therein spaced about its inner periphery and extending along the length of the calciner and projecting radially towards the axis of rotation of said calciner to effect continuous mixing of said compound during the reduction thereof, causing uncracked ammonia to flow as a reductant either concurrently of countercurrently at a predetermined rate relative to the flow of said compound at an amount calculated to range from about 5% to 100% excess of the stoichiometric amount required to reduce the compound to $MoO_2$ while said calciner is rotating, and bringing said molybdenum compound and said ammonia to a temperature in the range of about 300° C. to 700° C. at which a significant rate of reaction obtains, said reaction rate at said temperature range together with the rotation rate of said calciner being such as to provide a sufficient residence time in said calciner to convert the molybdenum compound to $MoO_2$ at a conversion efficiency of at least about 80%.

9. The method of claim 8, wherein the speed of rotation of said calciner ranges from about 3 to 10 rpm.

10. The method of claim 8, wherein the calcining temperature ranges from about 400° C. to 500° C., and wherein the residence time during reduction ranges from about 10 to 60 minutes.

11. A free flowing product consisting essentially of $MoO_2$ produced in accordance with the method of claim 8.

* * * * *